Sept. 9, 1969         R. C. SHARPLES                3,466,413
                      ELECTRICAL SWITCHES Filed March 19, 1968                          2 Sheets-Sheet 1

INVENTOR
RICHARD C. SHARPLES
BY Blascoe, Downing &
Leibold, ATTORNEYS

United States Patent Office 3,466,413
Patented Sept. 9, 1969

3,466,413
ELECTRICAL SWITCHES
Richard Colin Sharples, Burnley, England, assignor to Joseph Lucas (Industries) Limited, Birmingham, England
Filed Mar. 19, 1968, Ser. No. 714,202
Claims priority, application Great Britain, Mar. 31, 1967, 14,731/67
Int. Cl. H01h 9/02
U.S. Cl. 200—168                4 Claims

ABSTRACT OF THE DISCLOSURE

In an electrical switch a sleeve is secured to the facia panel of a road vehicle, and within the sleeve is a body containing the switch mechanism and the operating member of the switch. Resilient co-acting means are provided integral with the sleeve and body for maintaining the body in an operating position, but in the event of a crash the body can move relative to the sleeve to a position in which it will not harm an occupant of the vehicle.

---

This invention relates to electrical switches.

An electrical switch according to the invention includes a sleeve adapted to be secured to the facia panel of a road vehicle so as to extend forwardly of the vehicle from the facia panel, a body housed with the sleeve and carrying the switch mechanism and the operating member of the switch, and resilient co-acting means integral with the sleeve and the body for maintaining the body in an operating position, wherein the operating member projects from the sleeve into the passenger compartment of the vehicle, during normal operation of the switch, said means being such that the body is moved so that the operating member is substantially flush with the facia panel when the operating member is stuck forcibly, for example, by an occupant of the vehicle in the event of the vehicle crashing.

Figure 1:
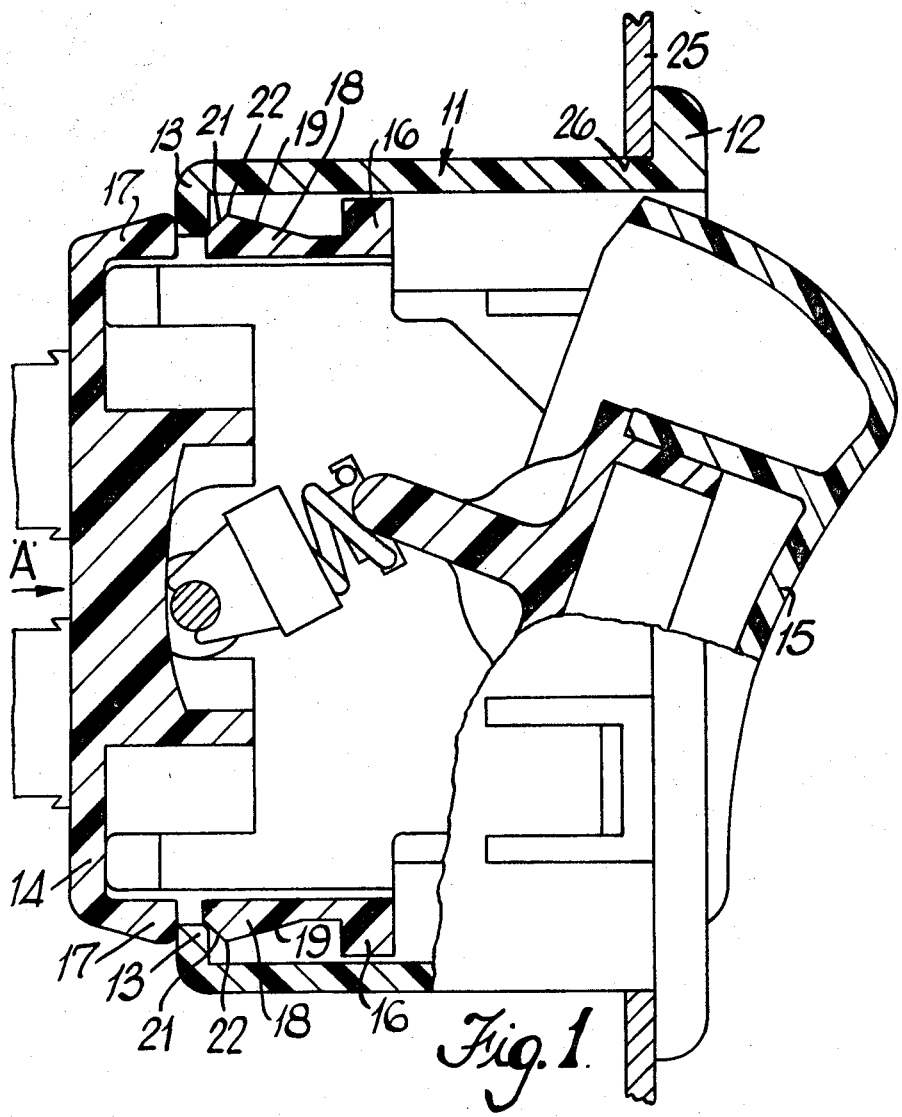
Figure 2:
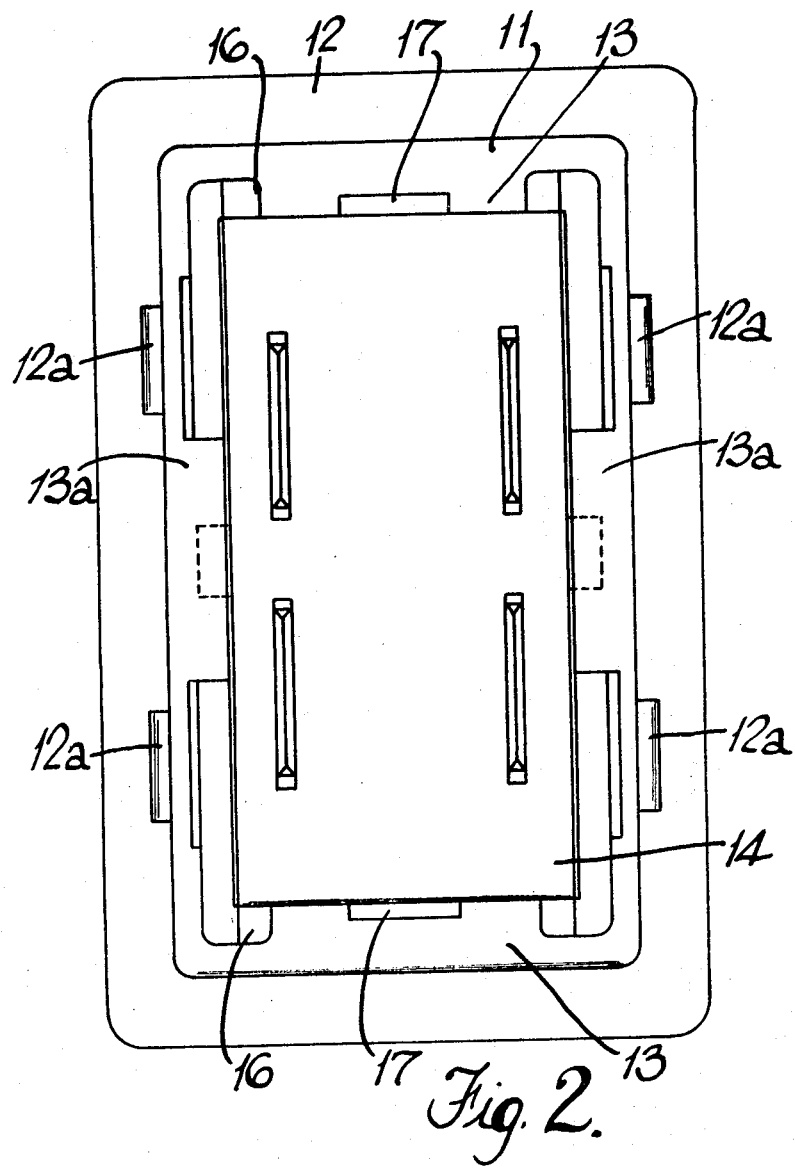

In the accompanying drawings, FIGURE 1 is a sectional view of an electrical switch according to one example of the invention, and FIGURE 2 is a view in the direction of arrow A in FIGURE 1.

Referring to the drawing, the switch includes a resilient sleeve 11 moulded in synthetic resin. At one end of the sleeve 11 is formed with a peripheral outwardly directed flange 12 and at its other end the sleeve 11 is formed with two pairs of inwardly directed flanges 13, 13a respectively.

The switch further includes an insulating body 14 housing the switch mechanism and pivotally engaged with the body 14 at one end is the operating member 15 of the switch. At said one end the body 14 is formed with a pair of outwardly extending flanges 16 while at its other end the body is formed with a pair of ramps 17. Between the flanges 16 and the ramps 17, the body 14 is formed with a pair of U-shaped slots which define in the walls of the body 14, a pair of resilient fingers 18.. Each of the fingers 18 is positioned with its free end adjacent a respective ramp 17 a gap being defined between the free end of the fingers 18 and the high end of the ramp 17. Moreover each of the fingers 18 includes a pair of oppositely directly ramp surfaces 19, 21 which merge at an apical edge 22 extending transversely of the finger 18.

In order to assemble the switch to a panel 25, for example the facia panel of a road vehicle, the panel 25 is formed with hole 26 into which the sleeve 11 is engaged as a snap fit, one face of the panel engaging the flange 12 while the other face of the panel is engaged by resilient fiangers 12a integral with the sleeve 11. The remainder of the sleeve 11 extends from the panel 25 remote from said one face thereof. The body 14 is inserted into the sleeve 11 from the passenger compartment of the vehicle with the ramps 17 first. The body 14 is snapped into engagement with the sleeve 11 so that the flanges 13 of the sleeve 11 are engaged between the ramps 13 and the fingers 13 and the fingers 18 of the body 14, the member 15 projecting from the sleeve 11 into the passenger compartment of the vehicle so as to be accessible for operation by an occupant of the vehicle.

Should the operating member 15 now be subject to an impact greater than a predetermined magnitude the fingers 18 will be flexed inwardly so that the body 14 rides past the flanges 13 and the member 15 will be moved forwardly into the sleeve 11. The flanges 13a guide the body 14 during each movement forwardly of the vehicle.

The impact magnitude necessary to cause the fingers 18 to flex inwardly is so chosen that if an occupant of the vehicle strikes the member 15, the body 14 will be pushed forwards rather than injuring the occupant.

In order to return the switch to its operative position the body 14 must be moved rearwardly to cause the fingers 18 to flex inwardly so that the body 14 rides back past the flanges 15.

It will be appreciated that the force required to operate the switch is insufficient to flex the fingers 18.

Having thus described my invention what I claim as new and desire to secure by Letters Patent is:

1. An electrical switch including a sleeve adapted to be secured to the facia panel of a road vehicle so as to extend forwardly of the vehicle from the facia panel, a body housed with the sleeve and carrying the switch mechanism and the operating member of the switch, and resilient co-acting means integral with the sleeve and the body for maintaining the body in an operating position, wherein the operating member projects from the sleeve into the passenger compartment of the vehicle, during normal operation of the switch, said means being such that the body is moved so that the operating member is substantially flush with the facia panel when the operating member is struck forcibly, for example by an occupant of the vehicle in the event of the vehicle crashing.

2. A switch as claimed in claim 1 wherein said means for maintaining the body in an operative position includes a pair of resilient parts on the body which, in the operative position of the switch, engage co-acting parts on the sleeve, said parts being flexed to allow the body to move relatively to the sleeve when the operating member is struck forcibly.

3. A switch as claimed in claim 2 wherein said resilient parts are resilient fingers integral with the body, and said co-acting parts are inwardly directed flanges integral with the sleeve.

4. A switch as claimed in claim 1 wherein the sleeve is engageable as a snap fit in a hole in a panel.

References Cited

UNITED STATES PATENTS

| | | |
|---|---|---|
| 2,767,276 | 10/1956 | Buchanan et al. |
| 2,779,833 | 1/1957 | Farison. |
| 2,803,718 | 8/1957 | Bloom et al. |
| 3,172,983 | 3/1965 | Zoda. |
| 3,305,658 | 2/1967 | Heyhal. |
| 3,337,708 | 8/1967 | Cervent et al. |
| 3,339,050 | 8/1967 | Mitchell. |

HERMAN O. JONES, Primary Examiner